Figure 1:
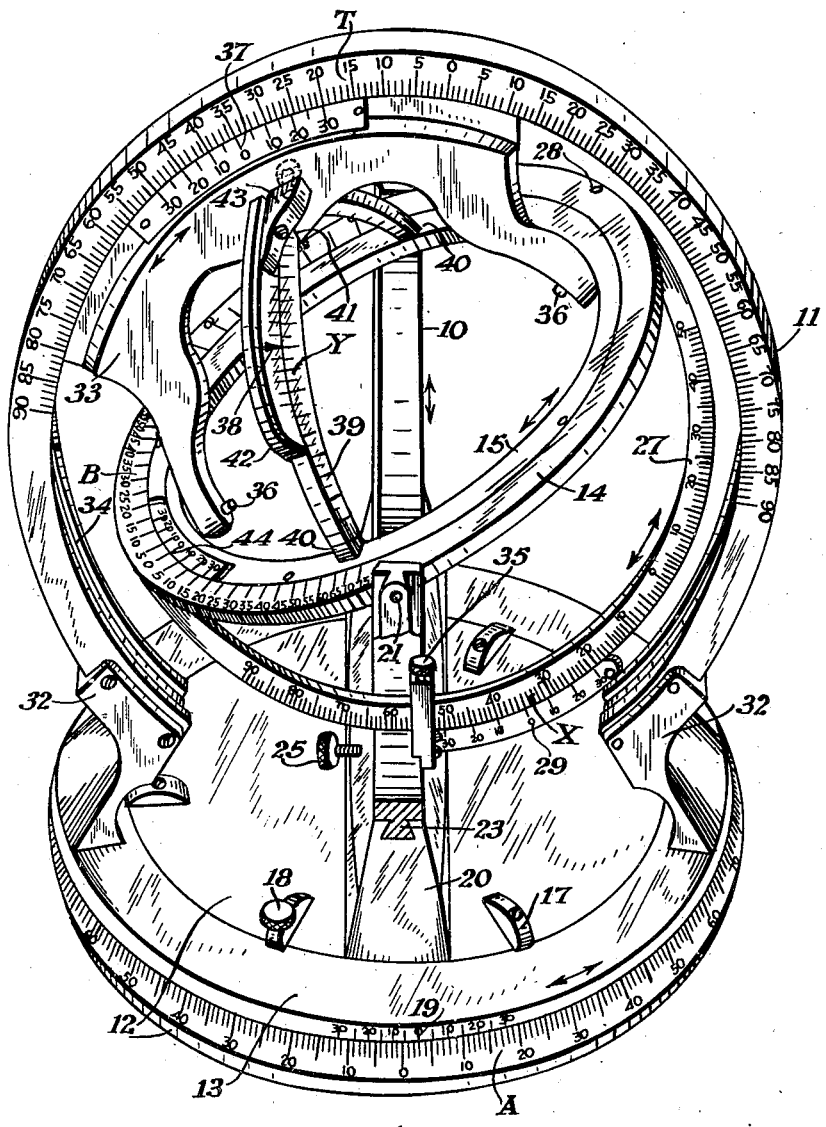

Sept. 27, 1949.    L. F. PALMER    2,483,228
COMPOUND ANGLE MEASURING DEVICE
Filed Oct. 23, 1945    3 Sheets-Sheet 1

INVENTOR.
LAWRENCE F. PALMER.
BY Bates, Teare & McBean.
Attorneys.

Sept. 27, 1949.  L. F. PALMER  2,483,228
COMPOUND ANGLE MEASURING DEVICE
Filed Oct. 23, 1945  3 Sheets-Sheet 2
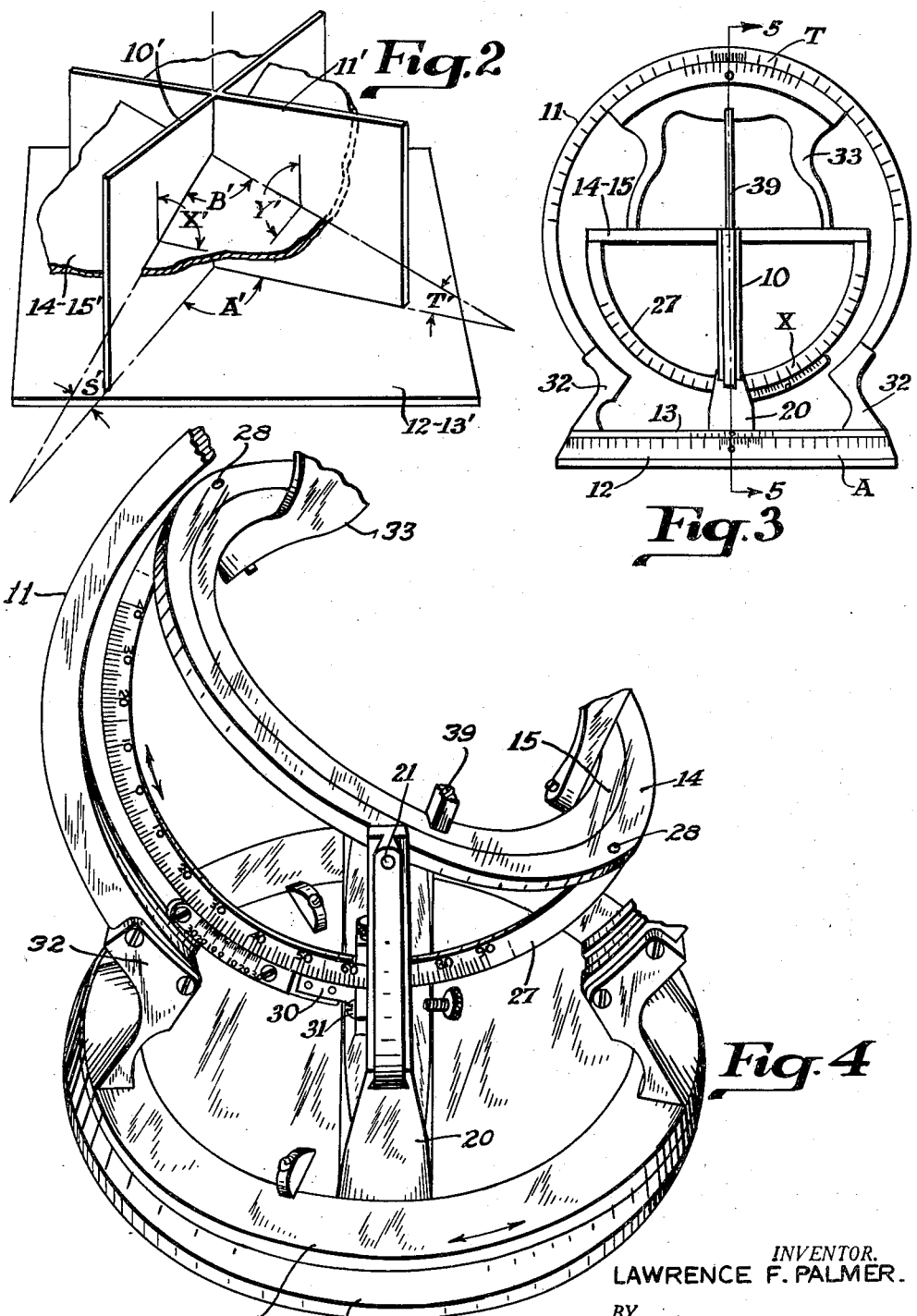
INVENTOR.
LAWRENCE F. PALMER.
BY Bates, Teare & McBean.
Attorneys.

Sept. 27, 1949.    L. F. PALMER    2,483,228
COMPOUND ANGLE MEASURING DEVICE
Filed Oct. 23, 1945    3 Sheets-Sheet 3
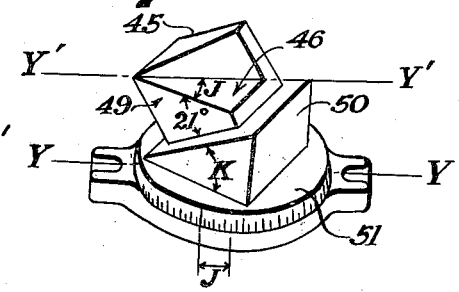
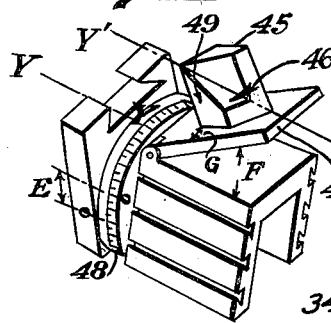
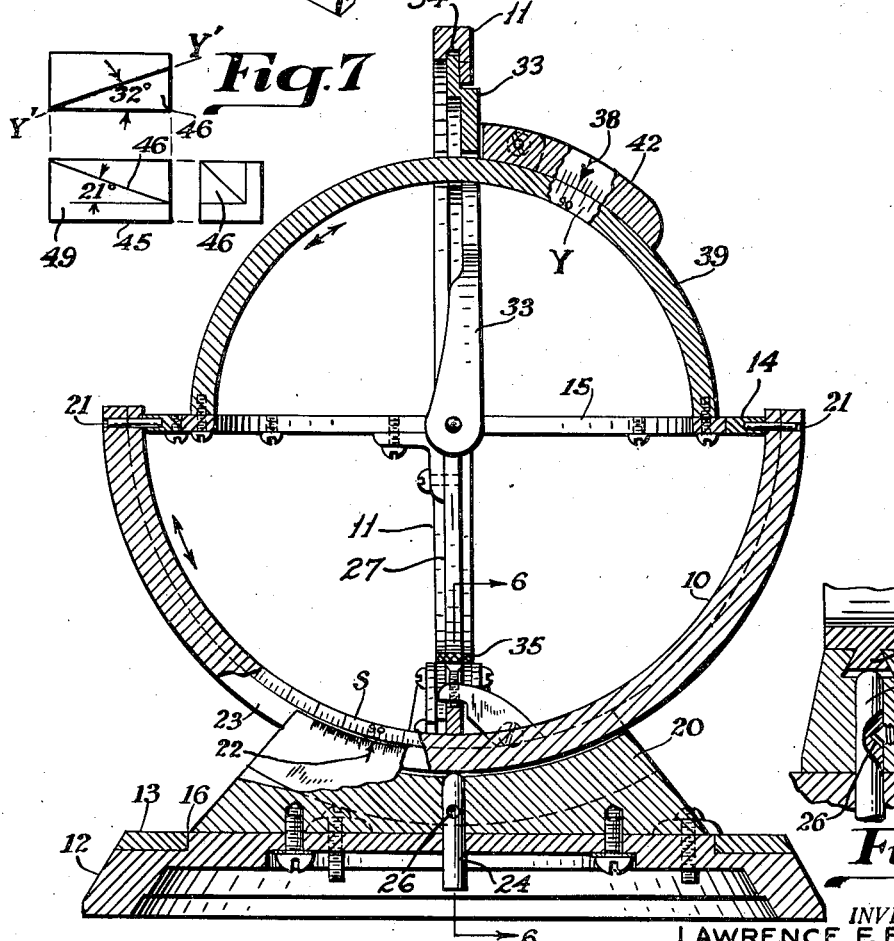
INVENTOR.
LAWRENCE F. PALMER.
BY Bates, Teare & McBean
Attorneys.

Patented Sept. 27, 1949

2,483,228

UNITED STATES PATENT OFFICE 2,483,228

COMPOUND ANGLE MEASURING DEVICE

Lawrence F. Palmer, Mentor, Ohio, assignor to Alfred H. Bower, Toledo, Ohio, as trustee Application October 23, 1945, Serial No. 623,971

3 Claims. (Cl. 33—1)

This invention relates to calculators and particularly to a measuring device designed to be used in the solution of compound angle problems.

Compound angle problems arise, for example, where one is dealing with solid geometric figures bounded by intersecting planes. There are numerous angles which can be measured upon such a solid and persons dealing with them are often confronted with a situation wherein some of the angles are known and other angles must be deduced from them. In each surface there are what may be called surface angles between the lines of intersection of adjacent planes, and between each intersecting pair of planes is what may be called the dihedral angle of the pair, meaning by this the angle between their intersections with an imaginary plane which is normal to their common line.

Machinists and tool makers in particular are frequently faced with situations of this kind wherein a work-piece has surfaces at odd angles and must be so placed upon the work holder of a shaper, planer, grinder, or the like that the surface to be machined will be parallel to the plane of the path of travel of the tool. Such set-ups while not difficult to one well versed in trigonometry and geometry are at least intricate and time consuming, and, to one not well versed in these subjects, can be most difficult and even quite baffling.

Apart from the question of difficulty is that of the likelihood of error resulting from the use of tables, as is necessary when dealing with the trigonometric functions. The trigonometric tables are reliably accurate but the danger of misapplying them or copying from them incorrectly is always present.

For the above reasons there has always been felt a great need for a calculating instrument on which the desired results could be read directly.

The general object of the present invention is to provide a device on which the known quantities in a compound angle problem may be set up and from which the desired answers may be read off directly.

Another object is to provide such a device which will be in as compact a form as possible and simple in construction and in use.

Referring now to the drawings, Fig. 1 is a perspective view of one embodiment of the compound angle measuring device of my invention; Fig. 2 is a diagrammatic representation of the principal planes of the device; Fig. 3 is a side elevation; Fig. 4 is a fragmentary perspective view of the side opposite that in Fig. 1; Fig. 5 is a transverse section taken on the line 5—5 in Fig. 3; Fig. 6 is a fragmentary section taken on the line 6—6 of Fig. 5; Fig. 7 is an orthographic projectional showing of a work-piece, the set-up of which may be calculated with my device; Fig. 8 is a perspective view of the work-holding fixture of a machine tool, such as a shaper, with the work-piece of Fig. 7 set up thereon; and Fig. 9 is a similar view of the work holder of a grinder.

As shown in the drawings, my device comprises a number of circular scales so pivoted and slidable on each other that the parts may be put in adjustable angular relationship with each other. The basic scheme of the device is shown in Fig. 2 where it will be seen that the various parts, and the angular relationship therebetween, may be represented by four planes of adjustable relative positions. The primed numbers on the planes are the same as the numbers unprimed of the corresponding parts of the device. The primed letters of the various angles are the same as the unprimed letters denoting the scales on the device where such angles are read. Two planes 10' and 11' are normal to a third plane 12—13' and at an adjustable dihedral angle A' with each other. A fourth plane 14—15' may be put in any desired angular relationship with the other planes. Its line of intersection with the plane 10' is at an angle S' with the base, and its line of intersection with the plane 11' is at an angle T' with the base. The surface angle B' between the two lines of intersection of the plane 14—15' is measured in that plane and, finally, the dihedral angle between the plane 14—15' with the plane 10' is measured at X', and that with the plane 11' is measured at Y'. Any three of these angles are sufficient to determine the plane and its position relative to the other planes. The remaining three angles definitely follow from the configuration and their values may be read on the scales of the device.

Referring now to the drawings of the device itself, it will be seen that the base 12 has an annular ring 13 rotatably slidable thereon. The base is provided with a rabbet at 16 to receive the ring and with cleats 17 to keep it in place. One of the cleats is provided with a thumb screw 18 and may therefore clamp the ring in an adjusted position. The base 12 is also provided with a scale A and the ring 13 carries a zero mark 19 and a cooperating vernier scale. Thus, by means of the scale A, the angular position of the ring relative to the base may be determined.

The vertical plane 10' of the diagram is defined by the semi-circular member 10 carried by a block 20 secured to the base 12.

The adjustable plane 14—15' of the diagram is defined in the instrument by two rings 14 and 15. The ring 14 is carried at two diametrically opposite points on pivot pins 21 in the ends of the semi-circular member 10. The line of intersection of the plane of the rings and the semi-circular member is thus defined by the axis of the pivot pins, and the angle of this line with the horizontal can be adjusted by rotating the semi-circular member 10 circumferentially on the block 20 as will later be described. The angular position of the line may be determined by means of a scale S on the member 10 and a coacting zero mark 22 appropriately placed on the support 20. The member 10 is provided with a dovetailed rib 23 which is slidable in a similarly shaped groove in the support 20. Means are provided, as best seen in Fig. 6, for clamping the member 10 in its adjusted position. As there shown, a vertically slidable pin 24 is adapted to press against the dovetailed rib. A thumb screw 25 is provided with a conical end which coacts with a conical indentation 26 in the pin 24. The wedging action obtained when the thumb screw is turned inwardly raises the pin against the dovetail and effectively clamps it. The arcuate support by the block 20 and the interfitting parts of the rib and groove rigidly maintain the member 10 in a vertical plane.

The dihedral angle X' of the diagram is measured by means of a scale X on an arc 27 rigidly carried by the ring 14. The arc 27 is semi-circular and its ends are securely bolted or otherwise rigidly secured to diametrically opposite points 28 on the ring 14. These points are at 90° around the ring 14 from the pivots 21 and thus, since the plane of the arc 27 is permanently at right angles with the ring, it is normal to the axis of the pivots. Therefore, the scale X and a cooperating zero mark 29 carried by the member 10 correctly gives the measure of the dihedral angle between the ring and the member 10. The zero mark 29, with its associated vernier scale, is conveniently carried by an angle piece 30 bolted to the member 10 as at 31 in Fig. 4. Also bolted to the member 10 is a clamp 35 comprising a bracket and a thumbscrew, whereby the arc 27 may be maintained in adjusted position.

The vertical plane 11' in the diagram is defined in the instrument by the annular trackway 11. This is rigidly maintained in a vertical plane by the supporting blocks 32 to which it is bolted and which are in turn bolted to the ring 13 on the base. Thus the dihedral angle between the plane of the member 10 and that of the trackway 11 may be adjusted by means of the slipping ring 13 on the base 12 and measured by the scale A.

The line of intersection of the plane 11 and of the plane of the tiltable ring is obtained by means of a traveler or slide 33 which runs in a groove 34 in the member 11. The slide 33 has sufficient circumferential support in the trackway 11 to maintain it in the plane of the latter. A second ring 15 is slidable within the ring 14 and is supported thereby by means of an appropriate tongue and annular groove joint, for example. At diametrically opposite points of the ring 15 pivotal connections, as at 36, are made with depending ears on the slide 33. Thus the axis of the pivots 36 defines the intersection line of the planes of the ring and the trackway 11. The angle between this line of intersection and the horizontal plane is measured by the scale T on the trackway 11 and the zero mark 37 and vernier scale on the slide 33.

As the ring 15 is adjustably rotated within the ring 14, the angle between the axis of the pivots 36 and that of the pivots 21 is measured by means of a scale B on the ring 14 and a zero mark 44 on the ring 15. The angle so measured is that at B' in the diagram.

To measure the dihedral angle between the plane of the ring and trackway, as indicated at Y' in the diagram, the scale Y and zero mark 38 are provided. The scale Y is inscribed on an arc 39 the ends of which are rigidly attached to the ring 15, at points 40, to maintain it in a plane normal to that of the ring. The points 40 are at 90° along the ring from the pivots 36. The arc 39 is slidable in a notch 41 in the slide 33 and the zero mark 38 is carried on an arcuate block 42 secured to the slide 33 by means of an angle piece 43. By this construction the scale Y at all times measures the dihedral angle in a plane which is at the same time normal to the plane of the rings and to that of the slide 33 and trackway 11.

It will be understood that the instrument is so constructed that the parts are all in strict alignment. That is, the four pivot pins at 36 and 21 all lie in the same plane, the axes of the trackway 11 and of the semi-circular member 10 intersect at the same point as the axes of the pairs of pivots, and the axis of rotation of the base ring 13 is coincident with the line of intersection of the planes of the members 10 and 11 and contains the common point of intersection of the other axes.

Referring now to Figs. 7, 8 and 9, the operation of the instrument will be shown as applied to a practical problem. Here the rectangular workpiece 45 of Fig. 7 is to be formed with an angular notch the sides of which are to be at the designated angles with the sides of the workpiece. As shown in Fig. 8, it is desired to so orient the block 45 on the work holder of a shaper that the surface 46 will lie in a horizontal plane as defined by the paths of movement of the cutting tool and feed of the machine and that the line of intersection Y'—Y' will be parallel with the line of movement of the cutting tool as defined by the line Y—Y. Three angles must be known to properly orient the workpiece, namely, E, F and G. The angle G is immediately known by inspection, as the plane of the tilting table 47 is the same as that of the plan view in Fig. 7, showing that the work-piece must be twisted 32° thereon.

Referring now to my device, it will be found that one has a choice of a number of ways of setting up the problem. This is often the case but I have found it best to so choose the planes that they will be found in their normal positions on the instrument. In the present case, therefore, it is best to represent the plane of the tilting table by means of the tilting ring 14—15. Horizontal planes in the set-up may be represented by the horizontal plane of the base of the instrument and two appropriate vertical planes may be found in the set-up to correspond to the vertical planes of 10 and 11. One such plane is conveniently taken transverse to the cutting motion of the shaper, that is, the plane of the scale 43 upon which the angle E is to be set. The second vertical plane is conveniently taken as that of the surface 49 of the work-piece as it is in this plane that the angle of 21° is given between the horizontal surface 46 and the tilting table. It will be noted that the surface 49 is a truly vertical plane because, as seen in Fig. 7, the front elevational view shows it to be normal to the machined surface 46.

Transferring the known quantities now to the instrument, we choose the plane of 10 as that of the surface 49 and set up on the scale S the angle of 21°. Since the surface 49 rises normal to the tilting table, we place the member 10 normal to the plane of the ring 14—15 by setting the scale X at 90°. Referring again to Fig. 8, we see that the line of the hinges of the tilting table defines the line of intersection of the plane of the table with a transverse vertical plane of the machine which, in the instrument, is represented by the member 11. We also see that the surface 49 of the work-piece meets the tilting table in a line whose angle with the line of the hinges is the complement of the angle G. The angle G has previously been found to be 32° and therefore the angle between the vertical planes as measured in the plane of the tilting table is 58°. On the instrument, the angle in the plane of the rings 14—15 is given by the scale B. Therefore, we now rotate the ring 13 upon the base 12 until the axes of the two pairs of pivots in the rings 14—15 are at an angle of 58°.

Three known quantities having been set on the instrument, definitely establishing the relationship of the parts, the desired results can be read directly on the instrument scales. The angle E of Fig. 8, which is a measure of the amount by which the line of hinges of the tilting table must be shifted from the horizontal, may be read on the scale T. In this case 10° 57'. The angle F in Fig. 8 is seen to be the complement of the dihedral angle between the tilting table and the vertical transverse plane. This angle is given by the scale Y in the instrument since this scale measures the dihedral angle between the rings 14—15 and the member 11, in this case 71° 58'. Angle F is the complement of this, or 18° 2'. Thus all that is needed to be known for the setting up of the work-piece has now been determined in a simple and accurate manner.

Another example of the application of my instrument may be demonstrated in connection with Fig. 9 wherein the same work-piece is to be set up on the work holder of a machine such as a grinder. The surface 46 is again to be horizontal and the line of intersection Y'—Y' is to be parallel to the path of the grinding wheel as defined by the line Y—Y. The work-piece 45 is mounted on a wedge block or tilting table 50 which, in turn, is mounted on a rotatable table 51 adjustable in a horizontal plane. Two angles must be determined in this case, namely, the angle K of the wedge block and the angle J of the rotating table. As before, the surface 49 is in a vertical plane and hence the angle K is seen by inspection to be 21°.

Referring now to the instrument, the base is taken as a horizontal plane and the rings 14—15 are taken as the surface of the wedge. The two vertical planes which are of interest comprise the one defined by the surface 49 and any one which is parallel to the path of the tool, that is, with the line Y'—Y' or Y—Y. The member 10 is taken as the vertical plane of surface 49 and the angle of 21° is set up on the scale S thereon. Since the face of the wedge block is normal to the surface 49, the rings 14—15 are placed normal to the member 10 by setting the scale X at 90°. As shown in the plan view of Fig. 7, the angle between the vertical planes as measured in the surface of the wedge is 32°, and so the ring 13 is now rotated on the base 12, directly corresponding to rotation of the horizontal table 51 in Fig. 9, until the ring 15 has revolved inside the ring 14 through 32° as measured on the scale B. The angle through which the base ring 13 has been rotated is now read on the scale A, giving the desired results for the angle J in Fig. 9, in this case 30° 15'. Thus the necessary angles have been quickly determined and the work-piece may be set up in the desired position. Were the set-ups of Figs. 8 and 9 to be computed, the work would be quite difficult to one not well versed in mathematics and, even at the best, would be quite time-consuming.

While I have illustrated a particular embodiment of my invention, I do not wish to be limited to any of the details here shown as it will be apparent that numerous modifications could be made by one familiar with the principles of my invention and substantially the same results would be obtained.

I claim:

1. An angle calculator having a stationary horizontal base comprising two relatively rotationally settable sections, an arcuate support on one of the base sections, an arcuate member circumferentially slidable in a vertical plane in the arcuate support, a tiltable member comprising two relatively rotationally settable sections one of which is pivoted at diametrically opposite points on the arcuate member, a second arcuate member rigidly carried by the second section of the base and defining a vertical plane, a traveler slidable on the second arcuate member and having pivotal connections at two diametrically opposite points on the second section of the tiltable member whereby the axis of pivotal connections is constrained to lie in the vertical plane of the second arcuate member, means for measuring the angle made with the base by the axes of the two pairs of pivots respectively, means for measuring the angle of rotation of the tiltable member about the first-named pair of pivots with respect to the first arcuate member, and means for measuring the angle of rotation of the tiltable member about the second-named pair of pivots with respect to the second arcuate member.

2. An angle calculator having a horizontal base comprising two relatively rotationally settable sections, an arcuate support on one of the base sections, an arcuate member circumferentially slidable in a vertical plane in the arcuate support, a tiltable member comprising two relatively rotationally settable sections one of which is pivoted at diametrically opposite points on the arcuate member, a second arcuate member rigidly carried by the second section of the base and defining a vertical plane, a traveler slidable on the second arcuate member and having pivotal connections at two diametrically opposite points on the second section of the tiltable member whereby the axis of pivotal connection is constrained to lie in the vertical plane of the second arcuate member, a circular scale rigidly supported on the first section of the tiltable member in a plane normal to the axis of the first pair of pivots and an indicator carried by the first arcuate member for coaction therewith, and a second circular scale rigidly supported on the second section of the tiltable member in a plane normal to the axis of the second pair of pivots and an indicator carried by the traveler for coaction with the second scale.

3. An angle calculator having a base, a base ring slidable in a plane on the base and having an axis of rotation normal to the plane, a support rigid with the base and having an arcuate groove, a semi-circular member slidable circumferentially in the groove and defining a second plane containing the axis of the base ring, a circular trackway rigidly carried by the base ring in a third plane containing the axis of the base ring, the trackway being interrupted to clear the arcuately grooved support, a traveler slidable in the trackway, a tiltable member comprising two concentric rings, the inner ring being slidably supported in the outer ring and having a pair of diametrically opposed pivotal connections with the traveler, the outer ring having a pair of diametrically opposed pivotal connections with the ends of the semi-circular member, the axes of the two pairs lying in the third and second planes respectively and intersecting the axis of the base ring and defining a fourth plane, a semi-circular scale rigidly carried by the outer tiltable ring in a plane normal to the axis of pivotal connections of said ring and midway between said connections, an indicator rigidly carried by the semi-circular member to coact with said scale, a second semi-circular scale rigidly carried by the inner tiltable ring in a plane normal to the axis of pivotal connections of said ring and midway between said connections, a second indicator rigidly carried by the traveler to coact with said second scale, a third scale and indicator on the outer and inner tiltable rings, a fourth scale and indicator on the circular trackway and traveler, a fifth scale and indicator on the semi-circular member and grooved support, and a sixth scale and indicator on the base and base ring.

LAWRENCE F. PALMER.

REFERENCES CITED

The following references are of record in the file of this patent:

UNITED STATES PATENTS

| Number | Name | Date |
|---|---|---|
| 2,051,810 | Ashlock | Aug. 25, 1936 |
| 2,108,260 | Harris | Feb. 15, 1938 |
| 2,149,716 | Beattie | Mar. 7, 1939 |
| 2,183,765 | Coleman | Dec. 19, 1939 |
| 2,376,315 | Elston | May 15, 1945 |
| 2,380,070 | Petrov | July 10, 1945 |

FOREIGN PATENTS

| Number | Country | Date |
|---|---|---|
| 211,434 | Germany | July 2, 1909 |